March 27, 1928.  
W. E. GIESECKE  
1,663,980  
NUT CRACKING MACHINE  
Filed March 3, 1927 5 Sheets-Sheet 1

INVENTOR  
William E. Giesecke  
BY  
ATTORNEY

March 27, 1928.  
W. E. GIESECKE  
NUT CRACKING MACHINE  
Filed March 3, 1927  
1,663,980  
5 Sheets-Sheet 2

March 27, 1928.  
W. E. GIESECKE  
NUT CRACKING MACHINE  
Filed March 3, 1927

INVENTOR  
William E Giesecke  
BY  
ATTORNEY

March 27, 1928.

W. E. GIESECKE

NUT CRACKING MACHINE

Filed March 3, 1927

INVENTOR
William E Giesecke
BY
ATTORNEY

Patented Mar. 27, 1928.

1,663,980

UNITED STATES PATENT OFFICE.

WILLIAM E. GIESECKE, OF NEW YORK, N. Y., ASSIGNOR TO CHARLES T. WILSON COMPANY, INC., OF NEW YORK, N. Y., A CORPORATION OF NEW YORK.

NUT-CRACKING MACHINE.

Application filed March 3, 1927. Serial No. 172,422.

This invention is an improvement in nut cracking machines, and more particularly in machines for cracking large and tough nuts, such for instance as the Babassu.

Nuts of this character contain kernels, varying in number from one to six, each held in a cell in the shell of the nut. The endocarp of the nut is very hard, dense and homogeneous. The pericarp is tough and resistant, and of a fibrous nature, while the mesocarp is amorphous and relatively soft. The nuts are of lemon shape, the blunt or round end being the attached or blossom end. The wings which separate the kernel cells spring from a central column or mast of a very fine grained hard character, more brittle, but harder than the material of the wings or that of the endocarp.

This central column or mast provides the chief resistance against cracking the nut, in such manner as to open all of the cells, it being desirable to split or burst the nut by pressure on the nut applied at or around the ends of its longitudinal axis. Because of the fact that the number of kernels, while variable, rarely exceed six, it is desirable to split the nuts radially into six or more segments thereby to positively release each kernel, and with this object in view, the cracking mechanism includes as its principal feature a plurality of knives or blades, diverging from a common center and designed to traverse the nut longitudinally usually from the blunt toward the pointed end.

The knives are usually supported by a cutter head, with which cooperates an anvil for supporting the pointed end of the nut during the cracking, and the head and anvil are mounted for relative movement toward and from each other.

One of the primary objects of the present invention is to provide an arrangement of cutter head, such that the cutting of the nuts into segments is greatly facilitated, by eliminating the necessity for the longitudinal cutting through the central column or mast.

Another object is the provision of mechanism in connection with the cutter head for segregating the central column or mast from the remainder of the nut during the splitting of the shell into segments, by cutting around the said column thus to release it from the wings which separate the cells.

Another object is the provision of a cutter head having knives or blades so arranged that the cutting of that portion of the nut around the central column into segments is greatly facilitated and with little or no possibility of injury to the kernels during the cutting.

Another object is the provision in connection with the mechanism for segregating the central column during the splitting of the nut, means to positively eject the column and the remaining parts of the nut from the cutter head.

A further object is the provision of an anvil so mounted that it may yield angularly with the nut to compensate for any twisting imparted to the nut by the cutter head.

Another object is the provision of mechanism in connection with the improved machine enabling adjustment of variation in size of the jaw opening, that is the distance between the cutter head and the anvil.

A further object is the provision of a plurality of connections between the motor for driving the machine and the movable parts thereof so arranged that either may be used, thus providing for different power ratios between the motor and the working parts, and for forward and reverse movement.

A further object is the provision of a type of machine, which may be readily combined into batteries of two or more, deriving motion from a common shaft.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the present embodiment of the invention, the improved machine comprises a frame of suitable structure, in the present instance composed of a pair of spaced parallel channel bars 1, suitably connected at their top by a cross bar 2 and at the bottom by a base 4. A bracket 5 is connected with the uprights near their upper ends, and this bracket carries the cutter head and the anvil to be described. The bracket has alined bearings 6 and 7, in which the cutter head and the anvil are respectively supported.

Figures 8, 9, 10, 11, 12, 13:
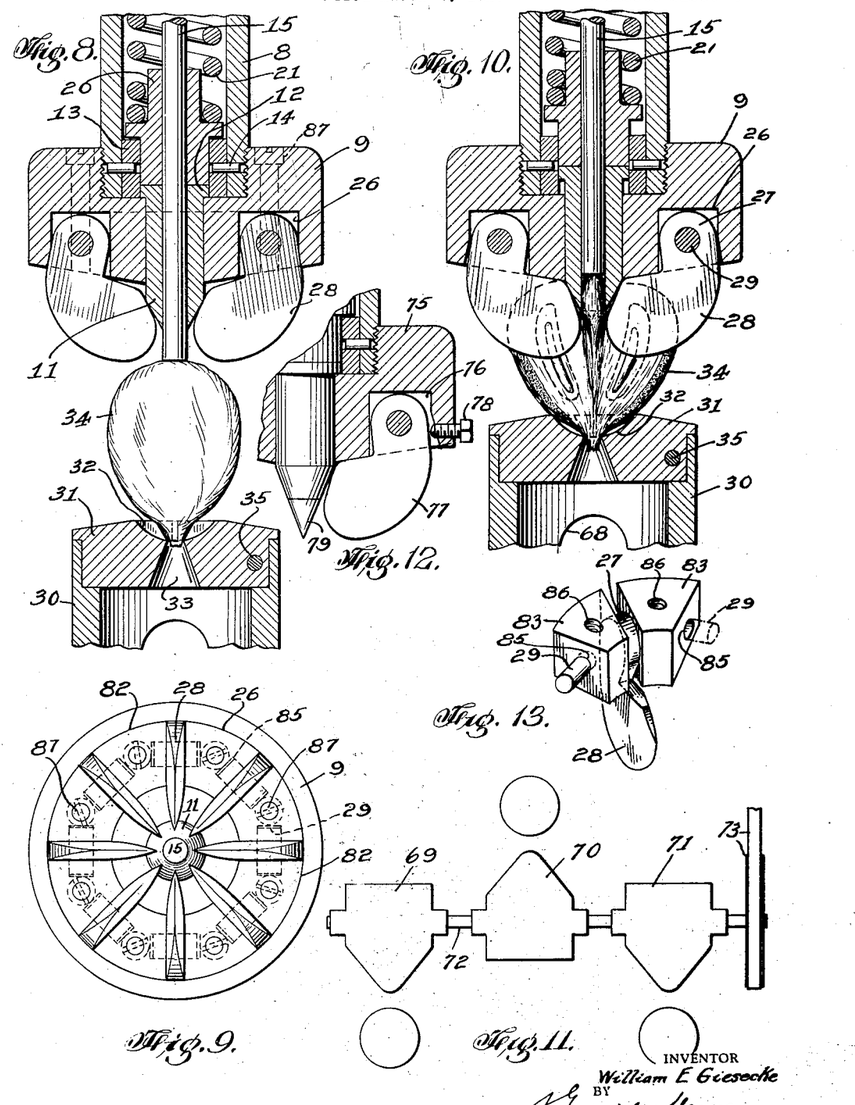
Fig. 8 is a detail in section showing the first step in the cracking of a nut.
Fig. 9 is a bottom plan view of the cutter head.
Fig. 10 is a view similar to Fig. 8 showing the cutting operation approximately half completed.
Fig. 11 is a diagrammatic plan view showing the method of assembling the cracking units in batteries to be operated from a common power shaft.
Fig. 12 is a section of detail showing an alternate form of blade mounting.
Fig. 13 is a perspective view of a part of the blade holding ring.

The cutter head comprises a sleeve 8 held in the bearing 6, by means of a head 9 on the lower end of the sleeve, and a nut 10 threaded on the upper end. The lower end of the sleeve is threaded into a socket in the head as shown in Fig. 8.

The head has a central bore in axial alinement with the sleeve, and in the bore is mounted a cylindrical or sleeve cutter 11, the lower end thereof being beveled as shown to provide a cutting edge about the bore of the cutter. The upper end has a marginal rib 12 engaging the head to limit the downward movement of the cutter and a bearing ring 13 encircles the rib between the same and the inner wall of the sleeve, the rib being held from rotation by radial pins 14 engaging alined openings in sleeve and ring.

A rod or pin 15 fits within the bore of the cutter 11, and the upper end of the rod passes through a cap nut 16 threadedly engaging the top of the sleeve 8. The upper end of the rod is adjustably connected with one end of a lever 17, pivoted at 18 at the other end to the cross bar 2 before mentioned. Flanged collars 19 and 20 encircle the rod at the cap nut, and at the cutter 11 respectively, and the collars act to center the ends of a coil spring 21 arranged within the sleeve, and encircling the rod. The spring normally tends to press the cutter 11 downward, but allows the cutter to move upward in circumstances to be mentioned later.

A link 22 connects the lever 17 intermediate its ends with a cross head 23 slidably mounted on the frame. The lower end of the link passes through an opening in the cross head, and a spring 24 is arranged between the cross head and adjustable stops or nuts 25 on the lower end of the link. By means of the nuts the tension of the spring may be varied as desired. The spring normally presses the rod 15 downward, but allows the rod to yield under a predetermined pressure, determined by the tension of the spring.

The lower end of the cutter head is substantially conical as shown, and at suitable intervals in the conical face the head is provided with recesses 26. Each of these recesses, of which in the present instance there are eight, is designed to receive a perforated ear or lug 27 on a cutting blade 28. The beveled edge of the blade, which forms the cutting edge, is of a substantially elliptical contour, so that a cutting edge is presented downward, inward and for a slight distance inward and upward, when the blades are in the normal position of Figures 8 and 10. It will be noticed referring to these figures that the recesses 26 are of such shape that the blades have a limited radial swinging movement. The blades are supported by pivot pins 29.

The anvil is supported in the bearing 7. This anvil includes a cylindrical shell 30 having its upper end closed by a head 31. The head as shown more particularly in Fig. 8, has the upper face thereof slightly conical, and the said face is provided with a central recess 32. A flaring opening 33 leads from the center of the recess through the head, and the recesses 32 and 33 are designed to receive the pointed end of the nut 34 to be cracked. As shown, the head is held in place by a cross pin 35. A plunger 36 is mounted in the shell, and the plunger is adjustably connected with the cross head 23 before mentioned. The lower end of the plunger is reduced as shown at 37 and is internally threaded to be engaged by the upper end of a link 38, pivoted at its lower end to the bracket as indicated at 39.

A bearing bracket 40 is provided for the link, the bracket being secured to the frame, and having a bearing through which the link slides. It will be evident that by relative angular movement of the plunger and the link the distance of the anvil top from the cross head may be varied, and to facilitate this angular movement a hand wheel 41 is secured to the reduced lower end of the plunger. A collar 42 is detachably held in the lower end of the shell 30 to limit the downward movement of the plunger with respect to the shell, the collar engaging the annular shoulder between the plunger and the reduced portion thereof.

Figure 2:
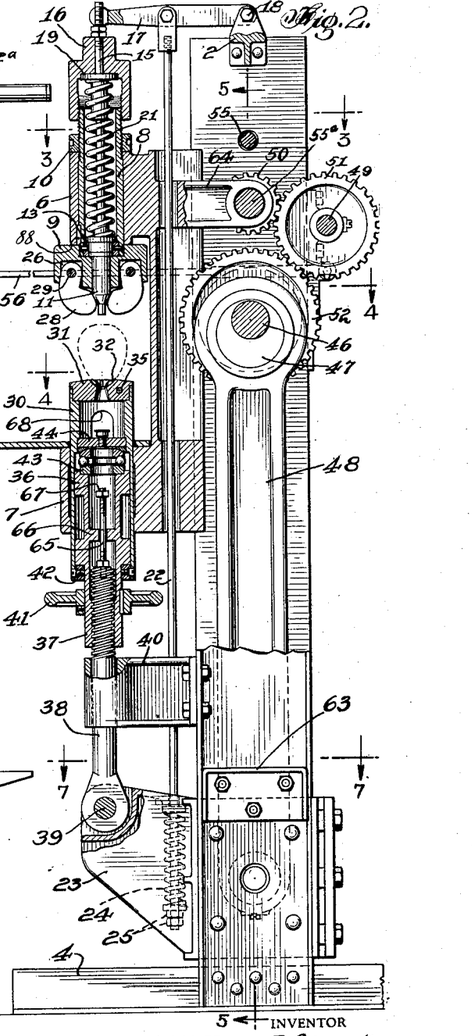
Fig. 2 is a vertical section.
Figure 3:
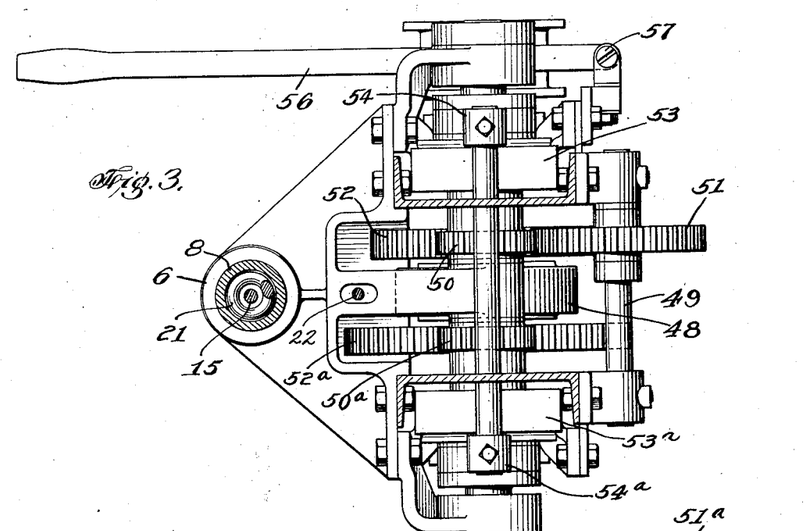
Figs. 3, 4, 5 and 7 are sections on the lines 3—3, 4—4, 5—5 and 7—7 respectively, of Fig. 2.

A ball bearing indicated generally at 43 is arranged between the upper end of the plunger and the shell 30. As shown in Fig. 2, a head 44 is held transversely of the shell near the top thereof, and the ball bearing is arranged between this head and the plunger. Thus the shell and the engaging part of the anvil may rotate freely with respect to the plunger. A plate 45 is secured to the bearing 7, and the anvil passes through the plate, the plate serving as a working table.

The cross head 23 is reciprocated through a shaft 46 journaled transversely of the frame, and provided with a cam or eccentric 47 which is engaged by a follower 48 connected with the cross head 23. It will be evident that when the shaft is rotated, the cross head will be reciprocated as also will be the anvil 31. The shaft 46 is driven from a power shaft 55ᵃ also journaled in the frame, and connected to the shaft 46 through an idler shaft 49. The shaft 55ᵃ has a pinion 50, meshing with a gear wheel 51 upon the idler shaft, and the gear wheel 51 meshes in turn with a gear wheel 52 on the shaft 46. The shaft 55ᵃ may be driven in any suitable manner, as for instance from a source of power connected to the wheel 51ᵃ secured on the shaft. The shaft may also be operated manually, and to enable this operation a crank 52ᵃ is connected with the wheel.

The pinion 50 before mentioned is journaled loosely on the shaft 55ᵃ, and is adapted to be connected thereto by the clutch indicated at 53. The movable member of this clutch, which is slidable on the shaft, has an arm 54 secured to one end of a rod 55 mounted to move laterally in the frame, and having guided movement in the uprights 1. When the rod is moved in one direction, the clutch is engaged, while when it is moved in the opposite direction the clutch is disengaged.

In order to enable the shaft 46 to be operated from the motor with different power ratios, a second connection is provided between the said shaft and the shaft 55ᵃ. A second pinion 50ᵃ is mounted loosely on the shaft 55ᵃ, and this pinion meshes directly with a gear wheel 52ᵃ on the shaft 46. A clutch 53ᵃ is provided for connecting the pinion to the shaft, and the movable member of the clutch has an arm 54ᵃ secured to the rod 55. The arrangement is such that when the rod is pushed to the limit of its movement in one direction the pinion 50 will be engaged and the pinion 50ᵃ released. A similar movement of the rod to its limit in the opposite direction will release pinion 50 and engage pinion 50ᵃ. When the rod is in its intermediate position both pinions are free. The connection through the pinion 50 is indirect, that through the pinion 50ᵃ being direct, and the first named connection gives higher power with slower movement of the cross head and reverse rotation.

Figure 4:
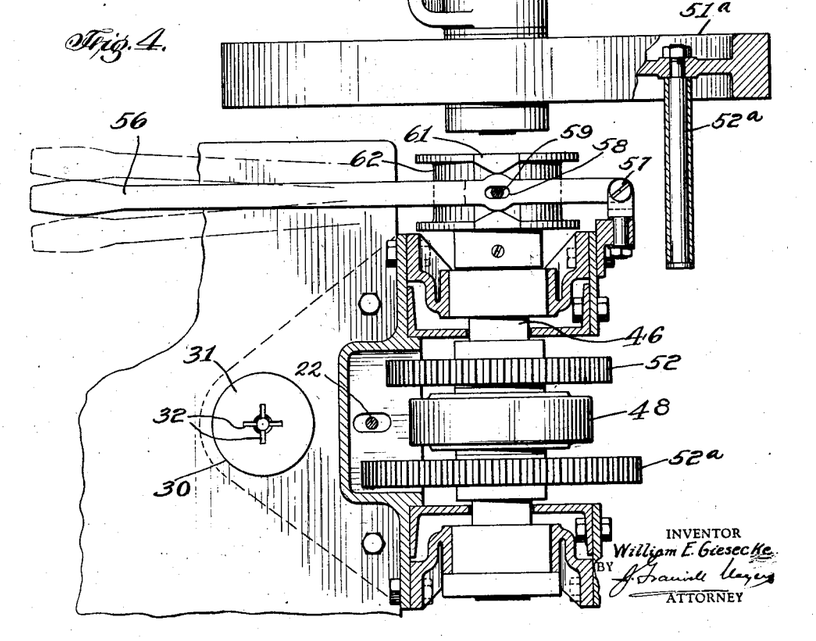

The rod 55 is moved by a shift lever 56. This lever is pivotly connected at one end to the frame 57. Intermediate its ends the lever has a slot 58 which is engaged by a pin 59, depending from a lateral extension 60 on the element 54 before mentioned. At the pin the lever passes through the channel of an insert block 61, which is held on the bearing 62 for one end of the shaft 46. As shown in Fig. 4, the channel of this plug flares toward its ends, and the lever has a rounded enlargement at the slot. The arrangement is such that the lever is held in either of the three positions indicated in Fig. 4, by engagement between the enlargement and the walls of the channel.

If for instance a nut harder than the average should be encountered, requiring additional power to cause the knives to cut properly, the machine may be shifted to the lower power gear. This in connection with the means to vary the extent of the jaw opening enables the proper and easy cutting of any character of nut. This change may be made during the cutting of a nut, that is after the nut has been partly cut if desired, either by stopping the machine with the parts in the position in which they happen to be, making the adjustment and completing the stroke, or by returning the parts to normal position before making the adjustment.

Nuts will be met which will split before the stroke of the anvil is completed, and in such cases it is desirable to prevent further penetration of the blades into the split shell, to avoid undue cutting of the kernels. When this occurs, the shifting lever is operated to reverse the movement of shaft 46, returning the parts to normal position.

Figure 5:
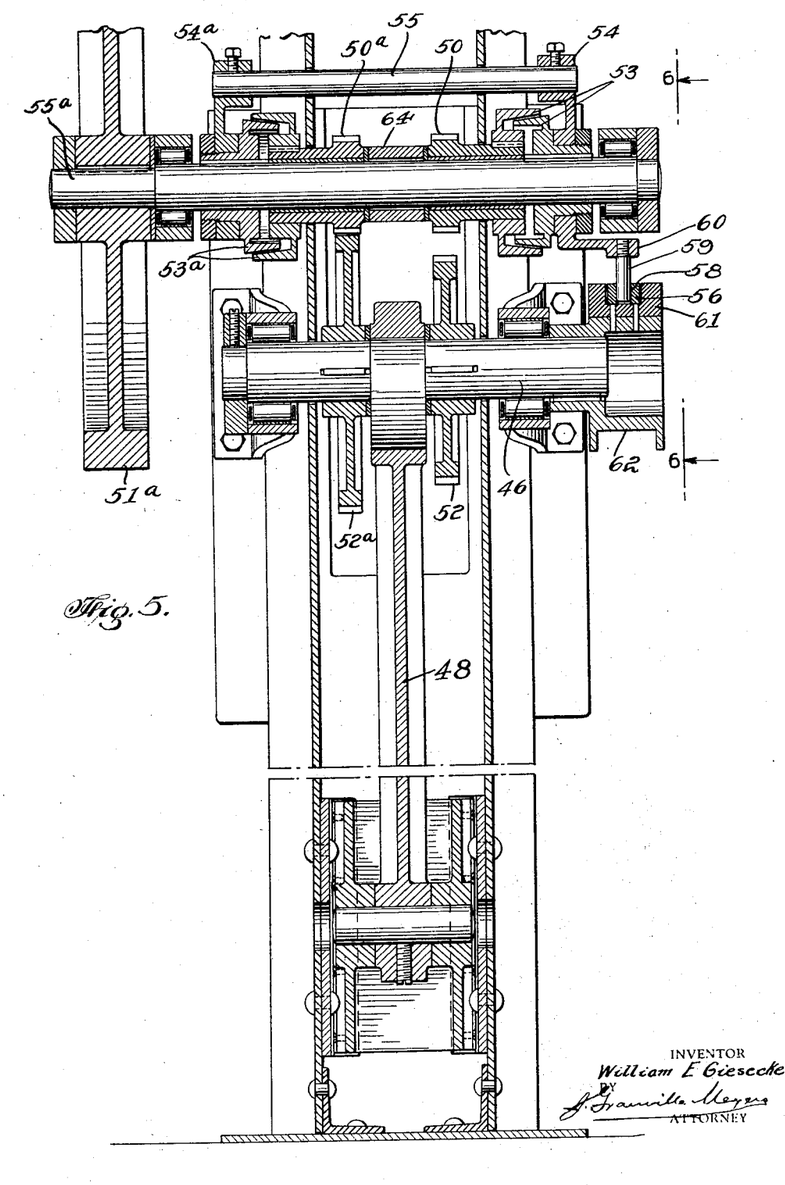
Figure 6:
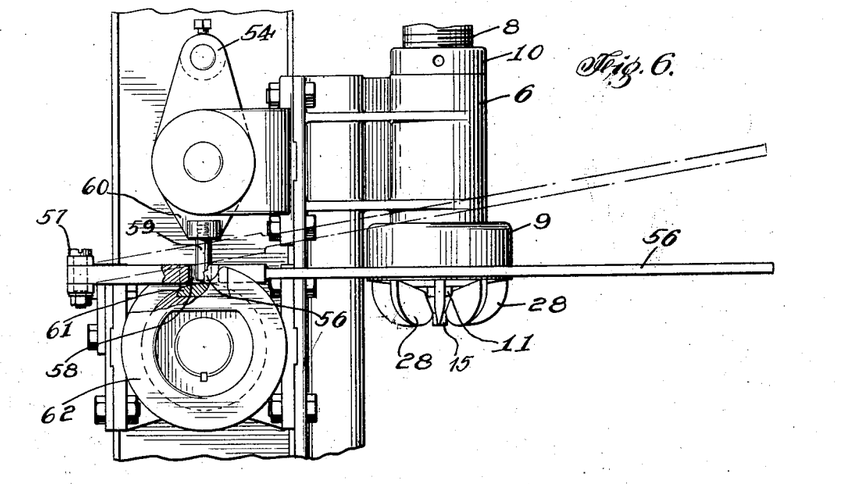
Fig. 6 is a view looking in the direction of the arrows at the line 6—6 of Fig. 5.
Figure 7:
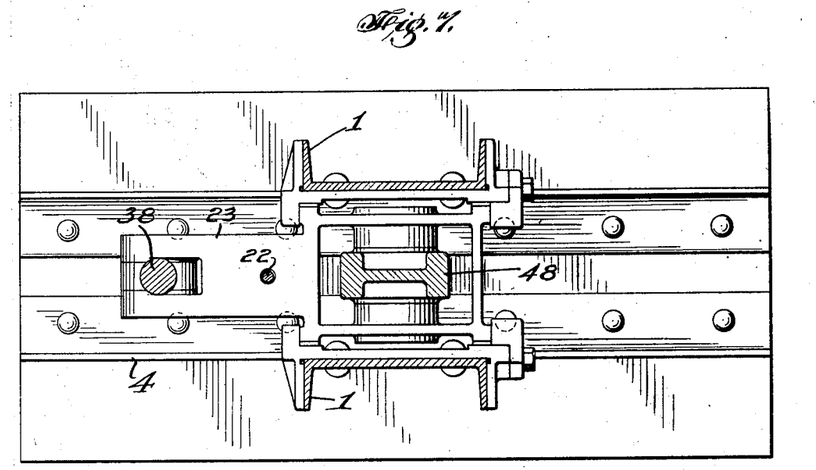

For the convenience of one manually turning the wheel 51, a platform 63 is supported by one of the standards 1. Referring more particularly to Fig. 5, it will be noticed that the bearings for the shaft 46 and 55ᵃ are roller bearings, and that the bracket 5 before mentioned has a bearing arm 64 engaging the shaft 55ᵃ between the frame members 1.

Means is provided for limiting separating movement of the plunger 36 and the link 38, and preventing accidental separation thereof. The said means includes a rod 65 having threaded engagement with the end of the link, and passing through an opening in a transverse partition 66 in the plunger. A nut 67 engages the rod above the partition, and the rod is of such length that the nut will engage the partition prior to complete separation of the plunger and link. To separate the parts completely, the collar 42 is released and the plunger withdrawn from the shell, after which access may be had to the nut 67. The shell has lateral openings 68 above the head 44 for the escape of any particles of the nut which may drop through the opening in the head 31.

The improved machine is particularly adapted for arrangement in batteries of two or more, deriving power from a common shaft, corresponding to the shaft 55ᵃ. Referring to Fig. 11, it will be noticed that a battery of three units is shown, the units being indicated at 69, 70 and 71 respectively. The common power shaft 72, which may be driven in any suitable manner, as for instance by the belt and pulley 73 takes the place of the shaft 55ª shown in Fig. 2. The units are arranged side by side, with the alternate units facing in the opposite direction from the intermediate units; that is with the units so arranged that the operators of the alternate machines are on the opposite side of the shaft 72 from the operators of the intermediate machines.

Figure 1:
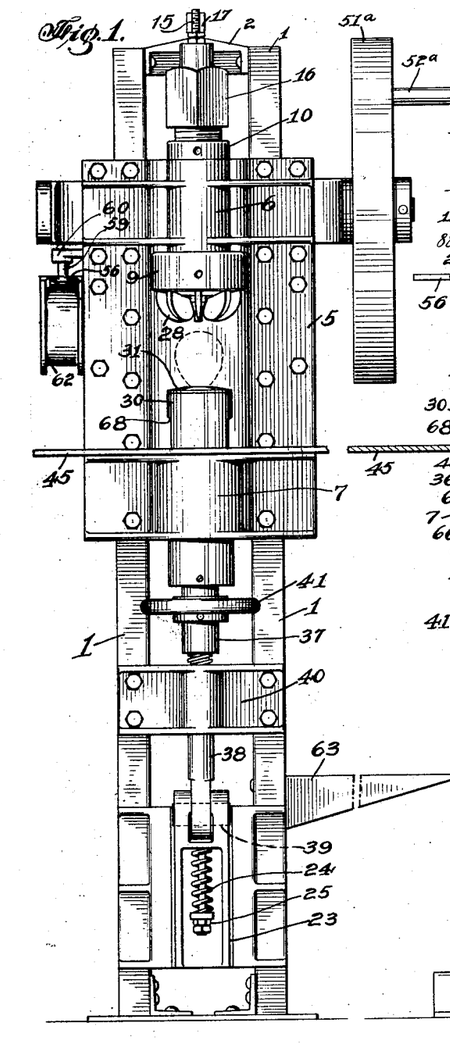
Fig. 1 is a front view of the improved machine.

The openings 68 in the plunger serve also another function. If it is desired to twist the nut during the cutting or immediately thereafter, to separate the segments, a lever may be inserted through the openings 68, and made use of to turn the plunger. All of the gearing is protected against the entrance of broken particles and the like from the operation on the nuts by the bracket 5. This bracket as shown in Figures 1 and 2 is closed between the uprights, and forms a face plate to protect the gearing.

It will be apparent from the Figures 8 and 10, that the blades are substantially L shaped, each consisting of two arms extending at substantially a right angle. One arm is pivoted to the head, and the other extends radially inward toward the rod or pin 15, which is a knock-out pin for releasing the core from the core cutter. The abutting surfaces of the head and the blades are so shaped, that when the blades are cutting, the upper edges of the lower or horizontal arms thereof, that is the portions of the blade directly opposite the point of greatest stress during cutting, abut the lower end or face of the head and bear against it, taking all the strain off of the pivot pins.

In Fig. 12, there is shown an alternate arrangement of blade mounting, and of knock-out pins. In this construction the head 75 is provided with the recesses 76 for the blades 77, in the same manner as with the head shown in Fig. 8. The outer or circumferential walls of the recesses are spaced slightly further outward than the corresponding walls in the Fig. 8 construction. A set screw 78 is threaded through the head at each recess, and against the set screw the blade abuts when it is in its outermost position. By means of the set screws the extent of the outward movement of the blades may be varied. In this arrangement also is shown an alternate arrangement of knock-out pin. The said pin indicated at 79 has a conical instead of flat point, so that the point of the pin forms a continuation of the beveled surface of the core cutter.

In operation, the nuts to be cracked are seated in succession on the anvil, with the point of the nut in the recess 32. If the nuts are running of about the same size, the extent of the jaw opening may be adjusted to correspond roughly with the length of the nut. If for instance, the nuts run small, the anvil will be adjusted toward the cutter head, while if the nuts run large, it will be adjused in the opposite direction. If there is no regularity in the run of the nuts, the adjustment will be easily made to receive the largest.

The power shaft 55ª may be rotated continuously, and when a nut has been placed, the operator moves the shift lever to connect the power shaft with the cam or operating shaft, using which ever connection is thought most suitable. As the shaft 46 rotates, the anvil is lifted, forcing the nut against the cutting head. The blades are pressed inward to the position shown in Fig. 10, and as the nut moves upward, the segments are turned outward by the inclined cooperating surfaces of the blades, and the core, that is the central mast or column is pressed upward into the core cutter, which cuts it away from the remainder of the nut. Preferably the nut is not entirely separated into segments, enough being left at the pointed end to hold the segments together. When the anvil moves away from the cutter head, the knock-out pin is forced downward by the link 22, pushing out the core from the core cutter, and positively ejecting the cut nut from the machine.

If it is desired to twist the nut to further separate the segments prior to the discharge thereof from the machine, the plunger or anvil is turned at or near the completion of the cutting movement. If during the cutting of a nut with the low power, the operator finds the cutting difficult, he can stop the parts with the shift lever, and immediately change the connection to the high power. He can check the movement of the jaws toward each other at any desired point, as for instance, in case the nut should split before the completion of the movement of the jaws toward each other.

In Figures 8, 9 and 13, is shown a preferred construction of cutter head. Referring to these figures and particularly to Figures 9 and 13, it will be seen that the lower faces of the head is annularly grooved or recessed as shown at 82 to receive a ring shaped blade assembly. This assembly may be removed with the blades in place. Referring to Fig. 13, it will be apparent that the ring is composed of spacing blocks 83, between which the blades are held, with the blade radial to the center of the ring assembly. Openings 85 are provided leading inwardly from the sides of the blocks to receive the pivot pins of the blades. The blocks are also provided with openings 86 in their tops to receive the screws 87 which hold the assembly in place.

The pins 14 before mentioned are more specially designed to hold the collar 13 in place during removal and replacement of the head. Since the spring 21 is under compression, the collar would be forced out during removal of the head, were it not for the pins. A key 88 is provided between the elements 6 and 8, to prevent relative rotation thereof. This key holds the element 8 from turning, during removal of the head or the cap nut, and against twisting stress of the nut.

In the battery arrangement of the machine, wherein the common power shaft is provided, any one or more can be disconnected from the shaft without interfering with the operation of the others. That is each machine on the shaft is wholly independent of the others, being connected to or disconnected from the shaft at will.

The skill of the operators of the individual machine may vary greatly. For instance one operator may be able to crack forty nuts a minute and another but four. Regardless of the skill of the respective operators, however, the entire battery may continue working, some of the machines cracking the minimum number of nuts and others the maximum.

What is claimed as new is:

1. In a machine of the class described, a pair of jaws mounted for relative movement toward and from each other, one of said jaws having a resiliently mounted core cutter of substantially cylindrical shape to partially segregate from the remainder of the nut a central column.

2. In a machine of the class described, a pair of jaws mounted for relative movement toward and from each other, one of said jaws having splitting blades to split a nut into a plurality of segments against counter pressure by the other jaw, said first named jaw having a core cutter of substantially cylindrical shape to partially segregate from the remainder of the nut a central column, said core cutter resiliently pressed toward the last named jaw.

3. In a machine of the class described, a pair of jaws mounted for relative movement toward and from each other, one of said jaws having splitting blades to split a nut into a plurality of segments against counter pressure by the other jaw, said first named jaw having a core cutter of substantially cylindrical shape to partially segregate from the remainder of the nut a central column, said core cutter resiliently pressed toward the last named jaw, and a knock-out pin for the segregated core operating to expel the core by relative movement of the jaws away from each other.

4. In a machine of the class described, a pair of jaws mounted for relative movement toward and from each other, one of said jaws being a cutter head, and the other an anvil for making counter pressure, the head including a central cylindrical core cutter and radial blades arranged about the core cutter, the core cutter resiliently pressed toward the anvil, and the head having means for limiting such movement.

5. In a machine of the class described, a pair of jaws mounted for relative movement toward and from each other, one of said jaws being a cutter head, and the other an anvil for making counter pressure, the head including a central cylindrical core cutter and radial blades arranged about the core cutter, the core cutter resiliently pressed toward the anvil, and the head having means for limiting such movement, the blades pivotally mounted to have a limited radial movement with respect to the core cutter.

6. In a machine of the class described, a pair of jaws mounted for relative movement toward and from each other, one of said jaws being a cutter head, and the other an anvil for making counter pressure, the head including a central cylindrical core cutter and radial blades arranged about the core cutter, the core cutter resiliently pressed toward the anvil, the head having means for limiting such movement, and resiliently controlled means to dislodge the core from the core cutter.

7. In a machine of the class described, a pair of jaws mounted for relative movement toward and from each other, one of said jaws having splitting blades to split a nut into a plurality of segments against counter pressure by the other jaw, said first named jaw having a core cutter of substantially cylindrical shape to partially segregate from the remainder of the nut a central column, the last named jaw rotatable on an axis parallel with the direction of movement of the jaws.

8. In a machine of the class described, a pair of jaws mounted for relative movement toward and from each other, one of said jaws having splitting blades to split a nut into a plurality of segments against counter pressure by the other jaw, said first named jaw having a core cutter of substantially cylindrical shape to partially segregate from the remainder of the nut a central column, the last named jaw rotatable on an axis parallel with the direction of movement of the jaws, and means enabling adjustment of the jaws with respect to each other during the relative movement thereof.

9. In a machine of the class described, a pair of jaws mounted for relative movement toward and from each other, one of said jaws being a cutter head, and the other an anvil for making counter pressure, the head including a central cylindrical core cutter and radial blades arranged about the core cutter, the core cutter resiliently pressed toward the anvil, and the head having means for limiting such movement, the blades pivotally mounted to have a limited radial movement with respect to the core cutter, and means adjustable with respect to the head to limit the outward movement of each blade.

10. In a machine of the class described, a pair of jaws mounted for relative movement toward and from each other, one of said jaws being a cutter head, and the other an anvil for making counter pressure, the head including a plurality of blades radially arranged about a common center, each blade including a substantially horizontal portion extending inwardly below the head and an angular portion pivoted to the head, the head having a recess for receiving said portion, and the lower end or face of the head abutting the upper edge of the blade when said blade engages a nut to release the pivot from strain.

11. In a machine of the class described, a pair of jaws, one of which is provided with cutting and splitting blades for separating a nut into sections, a drive shaft, an operating shaft, a connection between one of said jaws and the operating shaft for reciprocating said jaw when the shaft is rotating, a plurality of normally inoperative connections between the drive shaft and the operating shaft, said connections having different power ratios, and one being the reverse of the other, and means to engage either connection or to hold said connections in neutral position.

12. In a nut cracking machine, a cutter head comprising a substantially cylindrical structure having in one end thereof an annular groove concentric with the head, a ring assembly including spacing blocks between which the blades are pivoted, and means for holding the ring in the groove.

Signed at New York city in the county of New York and State of New York this 17th day of February A. D. 1927.

WILLIAM E. GIESECKE.